(12) United States Patent
Cho et al.

(10) Patent No.: US 9,410,603 B2
(45) Date of Patent: Aug. 9, 2016

(54) VEHICLE MULTISTAGE TRANSMISSION

(71) Applicant: Hyundai Motor Company, Seoul (KR)

(72) Inventors: Won Min Cho, Hwaseong-si (KR); Jae Chang Kook, Hwaseong-si (KR); Myeong Hoon Noh, Seongnam-si (KR); Seong Wook Ji, Ansan-si (KR); Kang Soo Seo, Yongin-si (KR); Seong Wook Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/741,909

(22) Filed: Jun. 17, 2015

(65) Prior Publication Data

US 2016/0146307 A1 May 26, 2016

(30) Foreign Application Priority Data

Nov. 26, 2014 (KR) .......................... 10-2014-0166589

(51) Int. Cl.
*F16H 3/66* (2006.01)

(52) U.S. Cl.
CPC .......... *F16H 3/66* (2013.01); *F16H 2200/0069* (2013.01); *F16H 2200/2012* (2013.01); *F16H 2200/2046* (2013.01); *F16H 2200/2097* (2013.01)

(58) Field of Classification Search
CPC ....................................................... F16H 3/66
See application file for complete search history.

(56) References Cited

U.S. PATENT DOCUMENTS

| 8,303,455 B2 | 11/2012 | Gumpoltsberger et al. |
| 2002/0119859 A1 | 8/2002 | Raghavan et al. |
| 2008/0103015 A1 | 5/2008 | Seo |
| 2010/0048344 A1 | 2/2010 | Kamm et al. |
| 2010/0069195 A1 | 3/2010 | Baldwin |
| 2015/0094185 A1 | 4/2015 | Beck et al. |
| 2015/0119188 A1 | 4/2015 | Beck et al. |

FOREIGN PATENT DOCUMENTS

| KR | 2011-0131816 A | 12/2011 |
| KR | 2013-0031455 A | 3/2013 |
| KR | 2013-0077146 A | 7/2013 |

*Primary Examiner* — Derek D Knight
(74) *Attorney, Agent, or Firm* — Morgan, Lewis & Bockius LLP

(57) ABSTRACT

A vehicle multistage transmission capable of realizing at least forward ten shift stages and a reverse first shift stage may include an input shaft and an output shaft, a first planetary gear unit, a second planetary gear unit, a third planetary gear unit, and a fourth planetary gear unit provided to transfer rotational force between the input shaft and the output shaft, each having three rotation elements, and at least six shift elements connected to at least one of the three rotation elements of the first, second, third, and fourth planetary gear units

7 Claims, 2 Drawing Sheets

*FIG. 2*

| SHIFT STAGE | CL1 | CL2 | CL3 | CL4 | CL5 | CL6 | GEAR RATIO |
|---|---|---|---|---|---|---|---|
| 1ST | ◯ | | ◯ | ◯ | | | 7.917 |
| 2ND | | | ◯ | ◯ | | ◯ | 3.750 |
| 3RD | | | | ◯ | ◯ | ◯ | 1.667 |
| 4TH | | ◯ | | ◯ | | ◯ | 1.444 |
| 5TH | ◯ | ◯ | | ◯ | | | 1.351 |
| 6TH | | ◯ | | ◯ | ◯ | | 1.267 |
| 7TH | | ◯ | | | ◯ | ◯ | 1.000 |
| 8TH | | ◯ | ◯ | | ◯ | | 0.600 |
| 9TH | ◯ | ◯ | ◯ | | | | 0.533 |
| 10TH | | ◯ | ◯ | | | ◯ | 0.474 |
| REV | | ◯ | ◯ | ◯ | | | 0.400 |

VEHICLE MULTISTAGE TRANSMISSION

CROSS-REFERENCE TO RELATED APPLICATIONS

This application claims priority to Korean Patent Application No. 10-2014-0166589, filed on Nov. 26, 2014, which is incorporated herein by reference in its entirety.

BACKGROUND OF THE INVENTION

1. Field of the Invention

Exemplary embodiments of the present invention relate to a vehicle multistage transmission, and particularly, to a technique capable of improving fuel efficiency of a vehicle by realizing many shift stages with the small number of parts and a simple configuration.

2. Description of Related Art

In recent years, world's vehicle manufacturers have started limitless competition for improvement in fuel efficiency due to increase in oil price and are making an effort to reduce weight and improve fuel efficiency through techniques such as downsizing in an engine.

Meanwhile, the fuel efficiency may be ultimately improved, for example, in such a manner that the engine is driven at a more effective driving point through a multistage method of a transmission mounted in a vehicle.

In addition, the multistage method of the transmission may further improve silence of the vehicle by driving the engine in a relatively low RPM range.

However, mounting, cost, weight, and transfer efficiency of the transmission may be deteriorated since the number of parts in the transmission is increased according to increase in shift stages of the transmission. Therefore, it is necessary to design a structure of the transmission capable of inducing maximum efficiency with the small number of parts and a relatively simple configuration in order to maximize improvement in fuel efficiency through a multistage method of the transmission.

The matters described as the related art have been provided only for assisting the understanding for the background of the present invention and should not be considered as corresponding to the related art already known to those skilled in the art.

SUMMARY OF THE INVENTION

An embodiment of the present invention is directed to a vehicle multistage transmission capable of realizing at least forward ten shift stages and a reverse first shift stage with the small number of parts and a simple configuration, so as to maximize improvement in fuel efficiency of a vehicle by driving an engine at an optimal driving point and to improve silence of the vehicle by more silently driving the engine.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a vehicle multistage transmission may include an input shaft and an output shaft, a first planetary gear unit, a second planetary gear unit, a third planetary gear unit, and a fourth planetary gear unit provided to transfer rotational force between the input shaft and the output shaft, each having three rotation elements, and at least six shift elements connected to at least one of the three rotation elements of the first, second, third, and fourth planetary gear units, wherein the first planetary gear unit is configured such that a first rotation element of the first planetary gear unit is selectively connected to a second rotation element of the first planetary gear unit while being continuously connected to a third rotation element of the second planetary gear unit and a first rotation element of the third planetary gear unit, the second rotation element of the first planetary gear unit is fixedly installed by one of the shift elements, and a third rotation element of the first planetary gear unit is continuously connected to a second rotation element of the second planetary gear unit and a third rotation element of the fourth planetary gear unit, wherein a first rotation element of the second planetary gear unit is selectively connected to second and third rotation elements of the third planetary gear unit, wherein the second rotation element of the third planetary gear unit is continuously connected to the input shaft, and the third rotation element of the third planetary gear unit is selectively connected to a second rotation element of the fourth planetary gear unit, and wherein a first rotation element of the fourth planetary gear unit is fixedly installed by another one of the shift elements, and the second rotation element of the fourth planetary gear unit is continuously connected to the output shaft.

The first, second, third and fourth planetary gear units are sequentially arranged in an axial direction of the input and output shafts.

The second rotation element of the first planetary gear unit is fixedly installed to a transmission case by a third clutch of the shift elements, wherein the first rotation element of the fourth planetary gear unit is fixedly installed to the transmission case by a fourth clutch of the shift elements, and remaining elements of the shift elements are configured to form variable connection structures between rotation elements of the first, second, third, and fourth planetary gear units.

A fifth clutch of the shift elements forms a variable connection structure between the first and second rotation elements of the first planetary gear unit, wherein a first clutch of the shift elements forms a variable connection structure between the first rotation element of the second planetary gear unit and the second rotation element of the third planetary gear unit, wherein a sixth clutch of the shift elements forms a variable connection structure between the first rotation element of the second planetary gear unit and the third rotation element of the third planetary gear unit, and wherein a second clutch of the shift elements forms a variable connection structure between the third rotation element of the third planetary gear unit and the second rotation element of the fourth planetary gear unit.

In another aspect of the present invention, a vehicle multistage transmission may include a first planetary gear unit, a second planetary gear unit, a third planetary gear unit, and a fourth planetary gear unit, each having three rotation elements respectively, six shift elements configured to selectively provide frictional force between the first, second, third, and fourth planetary gear units, and eight rotary shafts connected to the three rotation elements of the first, second, third, and fourth planetary gear units, wherein a first rotary shaft is an input shaft directly connected to a second rotation element of the third planetary gear unit, wherein a second rotary shaft is directly connected to a first rotation element of the first planetary gear unit, a third rotation element of the second planetary gear unit, and a first rotation element of the third planetary gear unit, wherein a third rotary shaft is directly connected to a second rotation element of the first planetary gear unit, wherein a fourth rotary shaft is directly connected to a third rotation element of the first planetary gear unit, a second rotation element of the second planetary gear unit, and a third rotation element of the fourth planetary gear unit, wherein a fifth rotary shaft is directly connected to a first rotation element of the second planetary gear unit, wherein a sixth rotary shaft is directly connected to a third rotation element of the third planetary gear unit, wherein a seventh rotary shaft is directly connected to a first rotation element of the fourth planetary gear unit, wherein an eighth rotary shaft is an output shaft directly connected to a second rotation element of the fourth planetary gear unit, and wherein a first clutch of the six shift elements is installed between the first and fifth rotary shafts, a second clutch of the shift elements is installed between the sixth and eighth rotary shafts, a third clutch of the shift elements is installed between the third rotary shaft and a transmission case, a fourth clutch of the shift elements is installed between the seventh rotary shaft and the transmission case, a fifth clutch of the shift elements is installed between the second and third rotary shafts, and a sixth clutch of the shift elements is installed between the fifth and sixth rotary shafts.

The first to fourth planetary gear units are sequentially arranged in an axial direction of the input and output shafts.

The first clutch is installed such that the first rotation element of the second planetary gear unit and the second rotation element of the third planetary gear unit are selectively connected to each other, wherein the second clutch is installed such that the third rotation element of the third planetary gear unit and the second rotation element of the fourth planetary gear unit are selectively connected to each other, wherein the fifth clutch is installed such that the first and second rotation elements of the first planetary gear unit are selectively connected to each other, and wherein the sixth clutch is installed such that the first rotation element of the second planetary gear unit and the third rotation element of the third planetary gear unit are selectively connected to each other.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation mode table of the transmission in FIG. 1

DESCRIPTION OF SPECIFIC EMBODIMENTS

Figure 1:
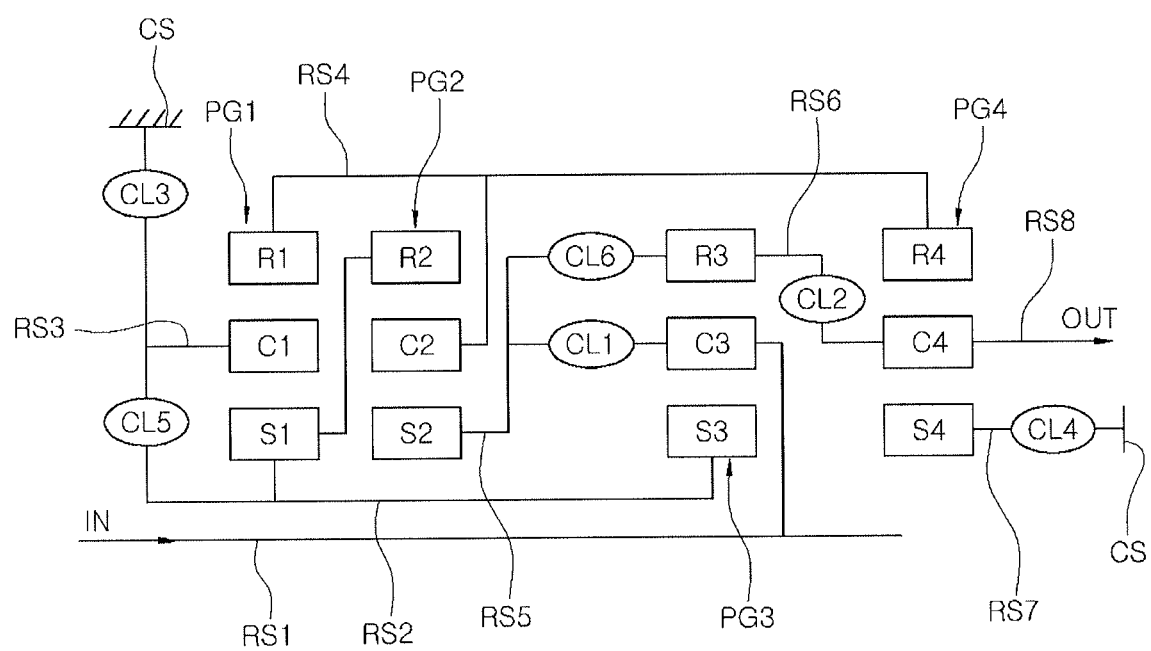
FIG. 1 is a diagram illustrating a configuration of a vehicle multistage transmission according to an exemplary embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Referring to FIGS. 1 and 2, a vehicle multistage transmission according to an exemplary embodiment of the present invention includes an input shaft IN and an output shaft OUT, a first planetary gear unit PG1, a second planetary gear unit PG2, a third planetary gear unit PG3, and a fourth planetary gear unit PG4 which are provided to transfer rotational force between the input shaft IN and the output shaft OUT, each having three rotation elements, and at least six shift elements connected to the rotation elements of the planetary gear units.

The first planetary gear unit PG1 is configured such that a first rotation element S1 of the first planetary gear unit PG1 is selectively connected to a second rotation element C1 of the first planetary gear unit PG1 while being continuously connected to a third rotation element R2 of the second planetary gear unit PG2 and a first rotation element S3 of the third planetary gear unit PG3, the second rotation element C1 is fixedly installed by one of the shift elements, and a third rotation element R1 of the first planetary gear unit PG1 is continuously connected to a second rotation element C2 of the second planetary gear unit PG2 and a third rotation element R4 of the fourth planetary gear unit PG4.

A first rotation element S2 of the second planetary gear unit PG2 is selectively connected to second and third rotation elements C3 and R3 of the third planetary gear unit PG3. A second rotation element C3 of the third planetary gear unit PG3 is continuously connected to the input shaft IN. A third rotation element R3 of the third planetary gear unit PG3 is selectively connected to a second rotation element C4 of the fourth planetary gear unit PG4. A first rotation element S4 of the fourth planetary gear unit PG4 is fixedly installed by another one of the shift elements. A second rotation element C4 of the fourth planetary gear unit PG4 is continuously connected to the output shaft OUT.

The first to fourth planetary gear units PG1 to PG4 are sequentially arranged in an axial direction of the input and output shafts IN and OUT.

The second rotation element C1 of the first planetary gear unit PG1 is fixedly installed to a transmission case CS by a third clutch CL3 of the shift elements, and the first rotation element S4 of the fourth planetary gear unit PG4 is fixedly installed to the transmission case CS by a fourth clutch CL4 of the shift elements.

Accordingly, the third and fourth clutches CL3 and CL4 function as brakes, respectively, and thus serve to restrict the second rotation element C1 of the first planetary gear unit PG1 and the first rotation element S4 of the fourth planetary gear unit PG4 to the transmission case CS so as to suppress rotation of the rotation elements C1 and S4.

The remaining elements of the shift elements are configured so as to form variable connection structures between the rotation elements of the planetary gear units.

That is, a fifth clutch CL5 of the shift elements forms a variable connection structure between the first and second rotation elements S1 and C1 of the first planetary gear unit PG1. A first clutch CL1 of the shift elements forms a variable connection structure between the first rotation element S2 of the second planetary gear unit PG2 and the second rotation element C3 of the third planetary gear unit PG3. A sixth clutch CL6 of the shift elements forms a variable connection structure between the first rotation element S2 of the second planetary gear unit PG2 and the third rotation element R3 of the third planetary gear unit PG3. A second clutch CL2 of the shift elements forms a variable connection structure between the third rotation element R3 of the third planetary gear unit PG3 and the second rotation element C4 of the fourth planetary gear unit PG4.

In the exemplary embodiment, the first, second, and third rotation elements S1, C1, and R1 of the first planetary gear unit PG1 refer to a first sun gear, a first carrier, and a first ring gear, respectively. The first, second, and third rotation elements S2, C2, and R2 of the second planetary gear unit PG2 refer to a second sun gear, a second carrier, and a second ring gear, respectively. The first, second, and third rotation elements S3, C3, and R3 of the third planetary gear unit PG3 refer to a third sun gear, a third carrier, and a third ring gear, respectively. The first, second, and third rotation elements S4, C4, and R4 of the fourth planetary gear unit PG4 refer to a fourth sun gear, a fourth carrier, and a fourth ring gear, respectively.

The vehicle multistage transmission having the above-mentioned configuration may also be represented as follows.

That is, the vehicle multistage transmission of the present invention includes a first planetary gear unit PG1, a second planetary gear unit PG2, a third planetary gear unit PG3, and a fourth planetary gear unit PG4 which each have three rotation elements, six shift elements configured to selectively provide frictional force, and eight rotary shafts connected to the rotation elements of the planetary gear units.

Here, a first rotary shaft RS1 refers to an input shaft IN which is directly connected to a second rotation element C3 of the third planetary gear unit PG3. A second rotary shaft RS2 is directly connected to a first rotation element S1 of the first planetary gear unit PG1, a third rotation element R2 of the second planetary gear unit PG2, and a first rotation element S3 of the third planetary gear unit PG3. A third rotary shaft RS3 is directly connected to a second rotation element C1 of the first planetary gear unit PG1. A fourth rotary shaft RS4 is directly connected to a third rotation element R1 of the first planetary gear unit PG1, a second rotation element C2 of the second planetary gear unit PG2, and a third rotation element R4 of the fourth planetary gear unit PG4. A fifth rotary shaft RS5 is directly connected to a first rotation element S2 of the second planetary gear unit PG2. A sixth rotary shaft RS6 is directly connected to a third rotation element R3 of the third planetary gear unit PG3. A seventh rotary shaft RS7 is directly connected to a first rotation element S4 of the fourth planetary gear unit PG4. An eighth rotary shaft RS8 refers to an output shaft OUT which is directly connected to a second rotation element C4 of the fourth planetary gear unit PG4.

In addition, a first clutch CL1 of the six shift elements is installed between the first and fifth rotary shafts RS1 and RS5. A second clutch CL2 of the six shift elements is installed between the sixth and eighth rotary shafts RS6 and RS8. A third clutch CL3 of the six shift elements is installed between the third rotary shaft RS3 and a transmission case CS. A fourth clutch CL4 of the six shift elements is installed between the seventh rotary shaft RS7 and the transmission case CS. A fifth clutch CL5 of the six shift elements is installed between the second and third rotary shafts RS2 and RS3. A sixth clutch CL6 of the six shift elements is installed between the fifth and sixth rotary shafts RS5 and RS6.

The vehicle multistage transmission of the present invention having the above-mentioned four simple planetary gear units and six shift elements realizes forward ten shift stages and a reverse first shift stage according to an operation mode table indicated in FIG. 2. Therefore, since the vehicle multistage transmission realizes the ten multi-shift stages with the small number of parts and the simple configuration, it may be possible to improve fuel efficiency and silence of the vehicle and to ultimately enhance productivity of the vehicle.

In accordance with the exemplary embodiments of the present invention, a vehicle multistage transmission may realize at least forward ten shift stages and a reverse first shift stage with the small number of parts and a simple configuration, so as to maximize improvement in fuel efficiency of a vehicle by driving an engine at an optimal driving point and to improve silence of the vehicle by more silently driving the engine.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle multistage transmission comprising:
an input shaft and an output shaft;
a first planetary gear unit, a second planetary gear unit, a third planetary gear unit, and a fourth planetary gear unit provided to transfer rotational force between the input shaft and the output shaft, each having three rotation elements; and
at least six shift elements connected to at least one of the three rotation elements of the first, second, third, and fourth planetary gear units,
wherein the first planetary gear unit is configured such that a first rotation element of the first planetary gear unit is selectively connected to a second rotation element of the first planetary gear unit while being continuously connected to a third rotation element of the second planetary gear unit and a first rotation element of the third planetary gear unit, the second rotation element of the first planetary gear unit is fixedly installed by one of the shift elements, and a third rotation element of the first planetary gear unit is continuously connected to a second rotation element of the second planetary gear unit and a third rotation element of the fourth planetary gear unit,
wherein a first rotation element of the second planetary gear unit is selectively connected to second and third rotation elements of the third planetary gear unit,
wherein the second rotation element of the third planetary gear unit is continuously connected to the input shaft, and the third rotation element of the third planetary gear unit is selectively connected to a second rotation element of the fourth planetary gear unit, and
wherein a first rotation element of the fourth planetary gear unit is fixedly installed by another one of the shift elements, and the second rotation element of the fourth planetary gear unit is continuously connected to the output shaft.

2. The vehicle multistage transmission of claim 1, wherein the first, second, third and fourth planetary gear units are sequentially arranged in an axial direction of the input and output shafts.

3. The vehicle multistage transmission of claim 2,
wherein the second rotation element of the first planetary gear unit is fixedly installed to a transmission case by a third clutch of the shift elements;

wherein the first rotation element of the fourth planetary gear unit is fixedly installed to the transmission case by a fourth clutch of the shift elements; and remaining elements of the shift elements are configured to form variable connection structures between rotation elements of the first, second, third, and fourth planetary gear units.

4. The vehicle multistage transmission of claim 3, wherein a fifth clutch of the shift elements forms a variable connection structure between the first and second rotation elements of the first planetary gear unit;

wherein a first clutch of the shift elements forms a variable connection structure between the first rotation element of the second planetary gear unit and the second rotation element of the third planetary gear unit;

wherein a sixth clutch of the shift elements forms a variable connection structure between the first rotation element of the second planetary gear unit and the third rotation element of the third planetary gear unit; and wherein a second clutch of the shift elements forms a variable connection structure between the third rotation element of the third planetary gear unit and the second rotation element of the fourth planetary gear unit.

5. A vehicle multistage transmission comprising:

a first planetary gear unit, a second planetary gear unit, a third planetary gear unit, and a fourth planetary gear unit, each having three rotation elements respectively;

six shift elements configured to selectively provide frictional force between the first, second, third, and fourth planetary gear units; and eight rotary shafts connected to the three rotation elements of the first, second, third, and fourth planetary gear units, wherein a first rotary shaft is an input shaft directly connected to a second rotation element of the third planetary gear unit;

wherein a second rotary shaft is directly connected to a first rotation element of the first planetary gear unit, a third rotation element of the second planetary gear unit, and a first rotation element of the third planetary gear unit;

wherein a third rotary shaft is directly connected to a second rotation element of the first planetary gear unit;

wherein a fourth rotary shaft is directly connected to a third rotation element of the first planetary gear unit, a second rotation element of the second planetary gear unit, and a third rotation element of the fourth planetary gear unit;

wherein a fifth rotary shaft is directly connected to a first rotation element of the second planetary gear unit;

wherein a sixth rotary shaft is directly connected to a third rotation element of the third planetary gear unit;

wherein a seventh rotary shaft is directly connected to a first rotation element of the fourth planetary gear unit;

wherein an eighth rotary shaft is an output shaft directly connected to a second rotation element of the fourth planetary gear unit; and wherein a first clutch of the six shift elements is installed between the first and fifth rotary shafts, a second clutch of the shift elements is installed between the sixth and eighth rotary shafts, a third clutch of the shift elements is installed between the third rotary shaft and a transmission case, a fourth clutch of the shift elements is installed between the seventh rotary shaft and the transmission case, a fifth clutch of the shift elements is installed between the second and third rotary shafts, and a sixth clutch of the shift elements is installed between the fifth and sixth rotary shafts.

6. The vehicle multistage transmission of claim 5, wherein the first to fourth planetary gear units are sequentially arranged in an axial direction of the input and output shafts.

7. The vehicle multistage transmission of claim 5, wherein the first clutch is installed such that the first rotation element of the second planetary gear unit and the second rotation element of the third planetary gear unit are selectively connected to each other;

wherein the second clutch is installed such that the third rotation element of the third planetary gear unit and the second rotation element of the fourth planetary gear unit are selectively connected to each other;

wherein the fifth clutch is installed such that the first and second rotation elements of the first planetary gear unit are selectively connected to each other; and wherein the sixth clutch is installed such that the first rotation element of the second planetary gear unit and the third rotation element of the third planetary gear unit are selectively connected to each other.

* * * * *